United States Patent
Ashdown et al.

(10) Patent No.: US 6,625,273 B1
(45) Date of Patent: Sep. 23, 2003

(54) SYSTEM AND METHOD FOR A LOCAL NUMBER PORTABILITY CACHE

(75) Inventors: Mike Ashdown, Frisco, TX (US); Dave S. Henderson, Fair Oaks, TX (US); Hu Shen, Plano, TX (US)

(73) Assignee: Sevis Systems, Inc., Dallas, TX (US)

( * ) Notice: Subject to any disclaimer, the term of this patent is extended or adjusted under 35 U.S.C. 154(b) by 0 days.

(21) Appl. No.: 09/537,016

(22) Filed: Mar. 28, 2000

(51) Int. Cl.$^7$ ................................................ H04M 7/00
(52) U.S. Cl. ............................ 379/221.13; 379/221.11
(58) Field of Search .......... 379/207.02, 221.08–221.13, 379/289

(56) References Cited

U.S. PATENT DOCUMENTS

| | | |
|---|---|---|
| 5,319,638 A | 6/1994 | Lin |
| 5,377,327 A | 12/1994 | Jain et al. |
| 5,598,464 A | 1/1997 | Hess et al. |
| 5,691,985 A | 11/1997 | Lorenz et al. |
| 5,701,301 A | 12/1997 | Weisser, Jr. |
| 5,717,748 A * | 2/1998 | Sneed et al. ................. 379/111 |
| 5,717,749 A | 2/1998 | Sneed, Jr. et al. |
| 5,732,131 A | 3/1998 | Nimmagadda et al. |
| 5,764,745 A * | 6/1998 | Chan et al. .................. 379/207 |
| 5,774,668 A | 6/1998 | Choquier et al. |
| 5,793,857 A | 8/1998 | Barnes et al. |
| 5,796,813 A * | 8/1998 | Sonnenberg ................. 379/220 |
| 5,802,285 A | 9/1998 | Hirviniemi |
| 5,867,569 A | 2/1999 | Martinez et al. |
| 5,883,948 A | 3/1999 | Dunn |
| 5,910,981 A * | 6/1999 | Bhagat et al. ............... 379/219 |
| 5,912,962 A | 6/1999 | Bosco |
| 5,933,489 A * | 8/1999 | Sensabaugh et al. ........ 379/219 |
| 5,933,490 A | 8/1999 | White et al. |
| 5,940,482 A | 8/1999 | Choi |
| 5,940,493 A | 8/1999 | Desai et al. |
| 5,949,870 A | 9/1999 | Hayduk |
| 5,949,871 A | 9/1999 | Kabay et al. |
| 5,951,694 A | 9/1999 | Choquier et al. |
| 5,983,281 A | 11/1999 | Ogle et al. |
| 5,983,282 A | 11/1999 | Yucebay |
| 6,002,759 A | 12/1999 | Kallioniemi et al. |
| 6,230,166 B1 * | 5/2001 | Velamuri et al. ......... 379/221.13 |

FOREIGN PATENT DOCUMENTS

| | | | |
|---|---|---|---|
| EP | 0710042 | 5/1996 | |
| WO | WO9916258 | 4/1999 | |
| WO | WO 99/35773 | 7/1999 | ............ H04J/1/100 |

OTHER PUBLICATIONS

M. Sevcik, R. Lueder, *Customers in Driver's Seat: Private Intelligent Network Control Point,* ISS Symposium ; Apr. 23, 1995; pp. 41–44.

International Search Report dated Oct. 1, 2001.

* cited by examiner

Primary Examiner—Ahmad F. Matar
Assistant Examiner—Hector Agdeppa
(74) Attorney, Agent, or Firm—Haynes and Boone, LLP.

(57) ABSTRACT

A system and method for intelligently caching Local Number Portability queries from a Public Switched Telephone Network (PSTN). The apparatus may include: an intelligent communications platform connected between a switch and a Signaling System 7 (SS7) network to intercept Transactions Capabilities Applications Part (TCAP) messages between the switch and the SS7 network; and a communications control module connected to the intelligent communications platform via a Transmission Control Protocol/Internet Protocol (TCP/IP) link, the communications control module for providing management and communications to the ICP and providing access to the management and communication for a plurality of subscribers. The apparatus can also include: an SS7 I/O card for processing SS7 messages; and a CPU card for processing Integrated Services Digital Network User Part (ISUP) and TCAP messages. The communications control module can include instructions for receiving messages from other ICPs for updated information on LNP queries. The communications control module can also include instructions for the plurality of subscribers to view results of LNP queries.

15 Claims, 3 Drawing Sheets

SYSTEM AND METHOD FOR A LOCAL NUMBER PORTABILITY CACHE

RELATED PATENT APPLICATIONS

This application relates to the following co-pending United States Patent Application, incorporates them by reference in their entirety and is assigned to the assignee of the present invention:

| Ser. No.: | Filing Date: | Inventors: | Title: |
| --- | --- | --- | --- |
| 09/536,541 | Mar. 28, 2000 | Ashdown et al. | Intelligent Communications Point Platform |
| 09/536,598 | Mar. 28, 2000 | Ashdown et al. | New and Improved System and Method for Data Traffic Redirection |
| 09/391,295 | Sept. 7, 1999 | Ashdown et al. | SS7 Firewall System |

BACKGROUND

The invention is related to the Common Channel Signaling System No. 7 (SS7) technology employed in the public switched telephone network (PSTN). The SS7 network is the backbone of the world's telecommunications networks. SS7 is a protocol developed by international standards organizations to efficiently manage call initiation, management, and termination, wireless services, including personal communications services (PCS), wireless roaming, and mobile subscriber authentication, local number portability (LNP), toll-free numbers and toll numbers (800 and 900 numbers), and a variety of other call features.

Communication on an SS7 network falls into two distinct categories: command and control signals and network traffic. General voice traffic is carried in-band on voice channels. The command and control signals are carried out-of-band and are used to manage the network traffic. The points on the network are divided into three classifications: Service Switching Points (SSP), Signal Transfer Points (STP), and Service Control Points (SCP).

At the most fundamental level, voice calls are transmitted from the user's handset to the originating SSP, to the destination SSP, and finally to the call recipient. Voice traffic is carried on large, multi-path trunk lines. The routing of SS7 traffic is managed by the STPs. (For simplicity, in the following example it is assumed that a call originates with one SSP and terminates with the destination SSP. In reality, a call may be routed through numerous SSPs before it reaches its destination.)

When a call is initiated, the SSP sends a message to the appropriate destination SSP. The STP routes the messages to the destination SSP. The originating SSP then designates which path in the trunk line between the two SSPs will carry the call, and notifies the destination SSP to establish the connection. When one of the parties hangs up, a call termination signal is generated by one SSP and relayed to the other.

Toll-free (800) calls, calling-card calls, wireless calls, and other such calls require the exchange of additional, non-circuit data between SSPs. Unlike standard calls that require no additional data in order to be routed by the STPs, these non-standard calls require additional information. The Transactions Capabilities Applications Part (TCAP) functionality defined in the SS7 protocol is used to obtain the additional routing information required to complete these calls. TCAP messages carry a variety of queries and responses between SSPs and SCPs.

For example, to facilitate toll-free (800) calls, the SSP performs a lookup to route the call. An 800 number is actually an alias for a standard telephone number. When a call is made to a toll-free number, the SSP must determine what standard telephone number the alias (800 number) represents. To do this, the SSP generates a TCAP query that is transmitted to an SCP. The SCP maintains a large database correlating the aliases with the standard phone numbers. The SCP looks up the correct number in the database and relays the number back to the SSP. The SSP then completes the call via the standard process.

Local Number Portability (LNP) lets subscribers keep their phone numbers after changing service providers or relocating. LNP is vital to the successful introduction of local telephone competition. LNP employs the same mechanism as toll-free numbers. To facilitate LNP, additional SCPs are established to allow LNP alias lookups.

As the entire telecommunications industry expands, the demand for LNP and other TCAP-related capabilities will escalate. SCPs are owned and operated by large telecommunications companies (typically Regional Bell Operating Companies or service bureaus) who charge a fee for each query. For small to mid-sized telecommunications companies, this expense will increase with any expansion. The only way these companies can presently eliminate this expense is to create their own SCP. The technical and economic barriers to creating SCPs are prohibitive for most of these companies.

As these TCAP-related calls become an increasing percentage of a company's traffic, it will become more and more important to manage the associated costs. Currently, the smaller telecom companies have no independent means for monitoring these costs. With no visibility of the TCAP traffic, they are solely dependent on the reporting mechanisms of the SCP for TCAP traffic statistics. The only current methods for implementing this visibility are designed for STPs, not SSPs. These methods are cost-prohibitive for smaller operators.

This increasing demand will cause another problem with the SS7 network in general. As LNP becomes commonplace, there will be a corresponding increase in the number of TCAP messages carried on the SS7 network. Therefore, what is needed is a means to minimize the number of queries made to the SCPs by the SSPs.

SUMMARY OF THE INVENTION

The present invention, accordingly, provides a system and method for minimizing the reliance upon SCPs for call routing data. The system, which is installed between the service providers' SSP and the network, acts as a local cache, storing the results of SCP queries. When subsequent requests for the same lookup is received, rather than being passed on to the SCP (and incurring a charge) the query is intercepted, a look-up is performed, and the locally stored number is sent back to the SSP. The SSP then has the information necessary to complete the call. By using the locally stored query result, the company avoids paying multiple fees for the same lookup. Query results are stored in the local cache with a defined expiration time. After the result expires from the cache, the subsequent request for the lookup will be executed in the standard fashion, retrieving the information from the SCP and repopulating the local cache.

The present invention is enabled by the Intelligent Communications Platform (ICP). Although the ICP is described in greater detail in the incorporated by reference patent application listed above entitled "Intelligent Communications Platform", a short summary will now be described. The ICP is located on the network between the SSP and the STP. It has no point code, and is therefore totally transparent to the SS7 network. The ICP intercepts all TCAP information into and out of the SSP. It is designed for fail-safe pass through of all SS7 information. In the event of an ICP fault SS7 traffic passes through unimpeded.

The ICP provides a platform for a variety of applications that monitor and manipulate this TCAP data. The ICP includes a TCP/IP connection to an Intelligent Communications System (ICS). The ICS is used to configure and manage these applications. In summary, the ICP adds additional intelligence and functionality to the customer's SSP at a reasonable cost.

A LNP cache (LNPC) application runs on the ICP, monitoring LNP queries. It incorporates a high-speed database where the results of queries are stored along with a time stamp. When a query is intercepted, the LNPC performs a database lookup. If the requested information is found, the LNPC sends the result back to the SSP, eliminating the SCP lookup. If the query does not yield a result, the LNPC maintains an active thread waiting on the response from the SCP. When the response is received it is stored in the database with a time stamp and relayed back to the SSP to complete the call. To maximize performance a caching algorithm is employed. In addition, configuration of the LNPC is accomplished via the ICS.

A primary technical advantage of the invention is the ability to minimize TCAP queries, and correspondingly reducing the fees paid for database lookups. Another advantage is to improve network performance. Inherent in this functionality is the visibility of TCAP traffic in the system. From one central point, the Intelligent Communications System (ICS), one or more ICPs can be monitored via TCP/IP links. This allows all of a company's TCAP traffic to be monitored at a central location. With this full visibility companies can independently monitor, audit, and manage TCAP traffic into and out of the company's SSPs.

Another technical advantage is the high degree of configurability, allowing customers to customize the application to meet their own requirements. The LNPC also provides a measure of redundancy in the event of an SCP fault. If the SCP fails, LNP queries that are stored in the cache can be answered, allowing these calls to be completed.

In addition, a system and method for intelligently caching Local Number Portability queries from a Public Switched Telephone Network (PSTN) is described. The apparatus may include: an intelligent communications platform connected between a switch and a Signaling System 7 (SS7) network to intercept Transactions Capabilities Applications Part (TCAP) messages between the switch and the SS7 network; and a communications control module connected to the intelligent communications platform via a Transmission Control Protocol/Internet Protocol (TCP/IP) link, the communications control module for providing management and communications to the ICP and providing access to the management and communication for a plurality of subscribers. The apparatus can also include: an SS7 I/O card for processing SS7 messages; and a CPU card for processing Integrated Services Digital Network User Part (ISUP) and TCAP messages. The communications control module can include instructions for receiving messages from other ICPs for updated information on LNP queries. The communications control module can also include instructions for the plurality of subscribers to view results of LNP queries.

These and other objectives and features of the invention encompass a comprehensive system for caching results of an LNP query for later use and thus resulting in lower costs by minimizing LNP queries.

Therefore, in accordance with the previous summary, objects, features and advantages of the present invention will become apparent to one skilled in the art from the subsequent description and the appended claims taken in conjunction with the accompanying drawings.

DETAILED DESCRIPTION

Figure 1:
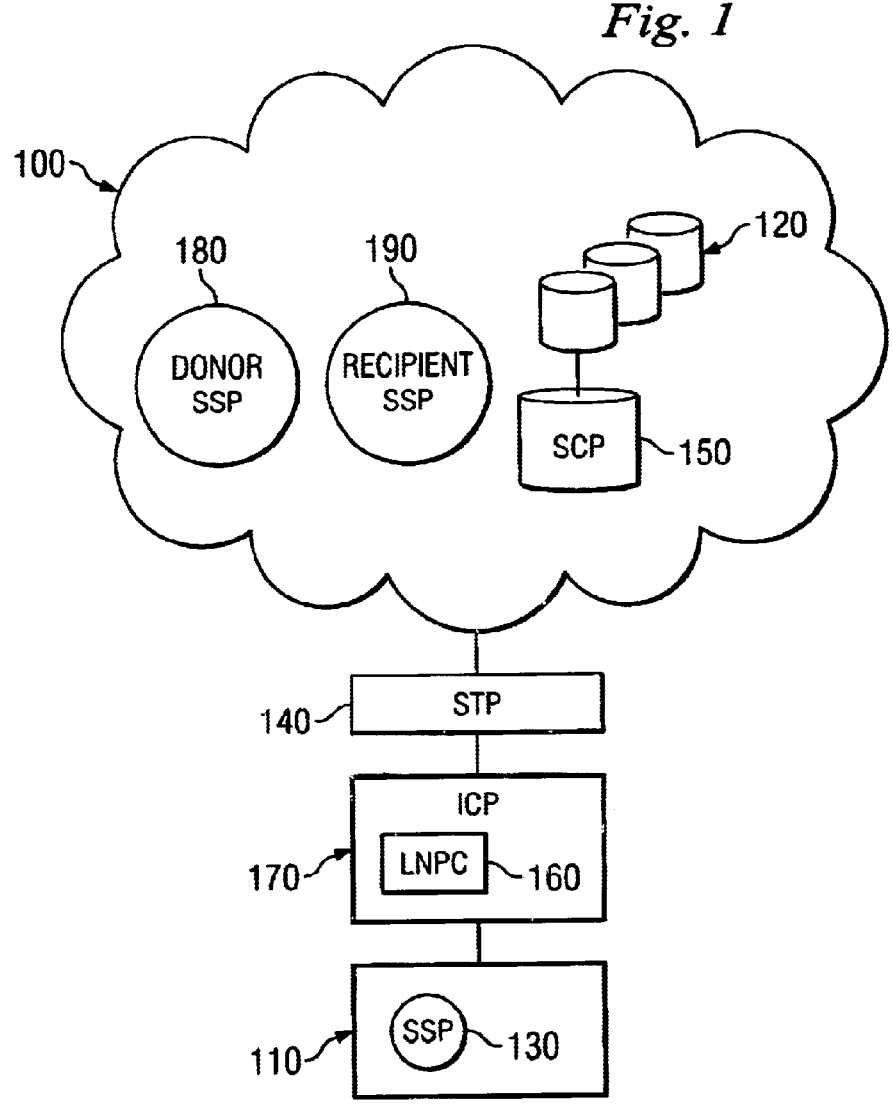
FIG. 1 is a schematic block diagram of an SS7 network showing the relationship between the invention and the ICP and the signaling end points on the network.

In FIG. 1, a reference numeral 100 designates a global SS7 network. The SS7 network is a vast collection of interconnected SS7 signaling nodes, including the SSP of a service provider 110. As will be described in greater detail below, the current invention includes a Local Number Portability Cache (LNPC) system. The LNPC 160 resides within the ICP 170, which is installed between the service provider SSP 130 and the network 100. The ICP 170 is completely transparent to the network, including the service provider's SSP 130.

Deregulation and open competition in the telecommunications industry now allow a subscriber to change service providers while keeping the same phone number. When this occurs, the subscriber's calls are no longer handled by the original, or donor SSP 180, but must be routed to the new recipient SSP 190. To implement LNP, a service provider must have access to updated routing information contained in the SCP database 120. When a subscriber places a call, the originating SSP 130 reads the call's dialed digits and determines if it is subject to an LNP lookup. If the number is associated with an LNP-enabled switch, a query is transmitted to the network 100 via the STP 140 and routed to the appropriate SCP 150 in order to determine the correct SSP for the dialed number. The SCP 150 returns the actual number to the SSP 130 and the call is completed.

Figure 2:
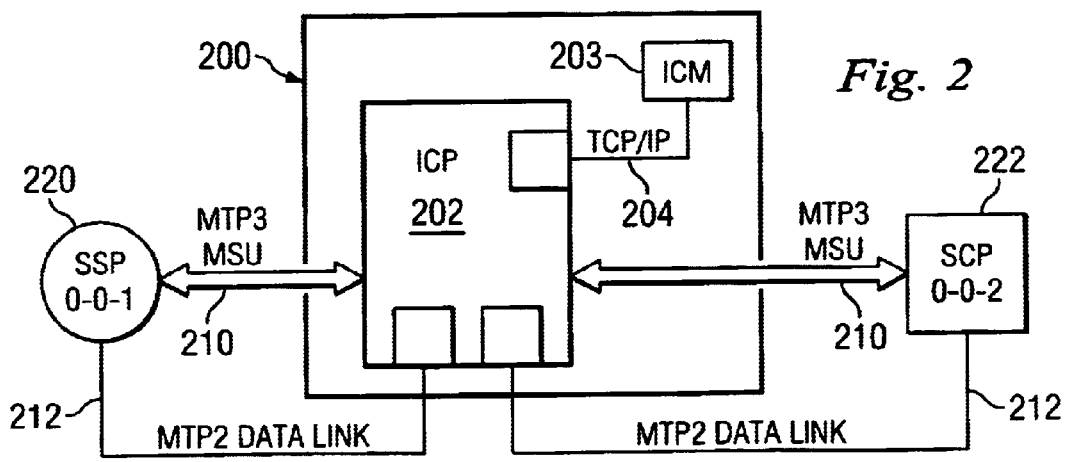
FIG. 2 is a simplified diagram illustrating a single network link between an SSP and an SCP.

FIG. 2 illustrates a single network segment of the global SS7 network 100. In FIG. 2, the reference numeral 200 refers to an LNPC system of the present invention. It should be recognized that system 200 is embodied in the LNPC system 160 of FIG. 1. The system 200 consists of an active intelligent communications platform (ICP) 202 deployed in-line between the service provider's SSP 220 and an SCP 222 located somewhere in the global SS7 network. As shown in FIG. 2, the originating point code (OPC) of the SSP 220 is 0-0-1 and the OPC of the SCP 222 is 0-0-2. The SS7 network includes redundant links 212. As described below, the ICP 202 maintains access to both redundant SS7 linksets and maintains signaling state for the combined linkset. Finally, the system 200 includes a management device 203 that maintains configuration, health and status, and visibility into the in-line devices 202. Although not shown, the management device 203 is capable of controlling multiple in-line devices, including one or more ICPs 202 within the network.

Several configurations are possible, whereby connectivity on the SS7 network may be a combination of physical layer access types such as: DS-1, DS-0A, DS-0, V.35 or Ethernet. For example, a complete SS7 implementation may be two DS-1s consisting of four DS-0As per DS-1 creating a combined linkset of 8 links.

The ICP 202 is a fully active Message Transfer Part (MTP) 2 datalink layer (the datalink layer is layer 2 of the seven layer OSI network model) device while providing the network layer (layer 3) and above visibility and control. Network layer control messages, such as re-alignment messages, are transferred autonomously from node to node, e.g. from the SSP 220 to the SCP 222, within the SS7 network. The ICP 202 manages these messages and coordinates control between the end nodes. This allows end nodes to operate as master of MTP 2, while communicating directly with the in-line device. The MTP3 message signaling units (MSUs) 210 are transferred end-to-end making the ICP 202 appear invisible to both the SSP 220 and the SCP 222, at the network layer and above.

While not shown, it is understood that more than one network addressable ICP 202 may be utilized within a service provider's network, at one or more locations, whereby LNP caching is provided for traffic out of a signaling point.

A control and management device 203 is connected via TCP/IP 204 to the ICP 202 for storage and display of logs, alerting, cache configuration, providing simple visibility, and other operational features of the ICP 202. Logs, TMM data, events, and management messages are piped using TCP/IP from the ICP to the control and management device 203 and may range from simple events to full SS7 call or transaction messages.

Figure 3:
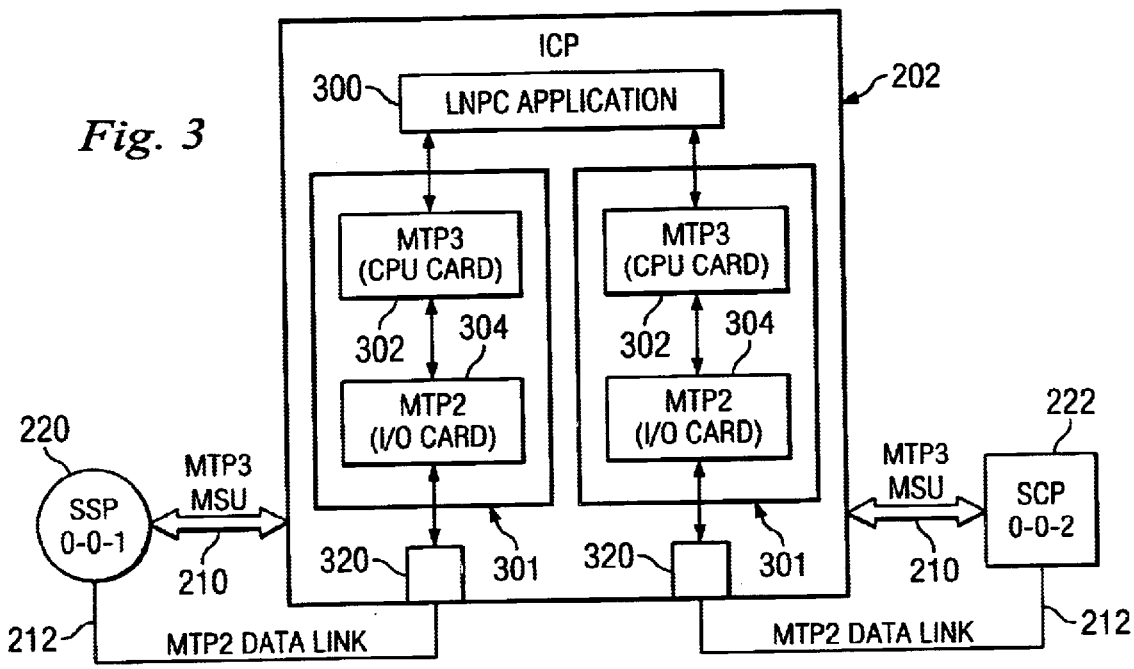
FIG. 3 is a more detailed drawing showing the functional elements of the ICP and how they support and interact with the invention.

FIG. 3 illustrates a functional schematic of the system. In one embodiment, the ICP 202 is configured with full redundant SS7 I/O cards 304 for processing MTP 2 and fully redundant CPU cards 302 for processing MTP 3, Integrated Services Digital Network User Part (ISUP), Signaling Connection Control Part (SCCP), and Transaction Capabilities Applications Part (TCAP) messages, all enclosed within a single chassis. The ICP 202 combines all state monitoring, line control, and transaction state control for implementing access and service control functions. The inventive functions performed by the ICP 202, as further described below, may be implemented with commercially available components as will be understood by those skilled in the art. While also not shown, it is understood that the ICP 202 is controlled and configured by computer programming instructions stored in memory within the in-line device and potentially other components of the system connected to the ICP.

The ICP 202 is a full MTP2 signaling link terminal. It also manages MTP3 management messages between end nodes, in this case the SSP 220 and the SCP 222. It manages the coordination of MTP3 traffic management, link management, and route management messages to synchronize MTP2 events between the two links.

Functionally, the ICP 202 consists of SS7 I/O logic 301, which contains MTP1, MTP2, and MTP3 stacks, located on the I/O cards 304 and CPU card 302. One function of the stacks is to process Message Signal Units (MSUs) for MTP3.

In addition, the ICP 202 contains MTP3 control logic located on the CPU card 302 and the LNPC application 300. These functions work independently of each other and provide higher-level visibility by processing signaling units into MSUs and MSUs into protocol data units (PDUs) (layer 4 and above of the seven-layer OSI network model).

As exemplified in FIG. 3, an SS7 MTP2 message signaling unit (MSU) containing a TCAP query and addressed for a signaling point, e.g. SCP 222, travels into the ICP 202 through an MTP1 port 320. The MSU travels up the SS7 protocol stack through the MTP2 I/O card 304 and the loosely coupled MTP3 stack 302. The MTP3 stack may reside on the CPU card 302, as shown in FIG. 3., or on the I/O card 304. Finally the MSU is delivered to the LNPC application 300. As will be described in greater detail later, the LNPC application 300 analyzes any TCAP query within the MSU and acts accordingly.

Figure 4:
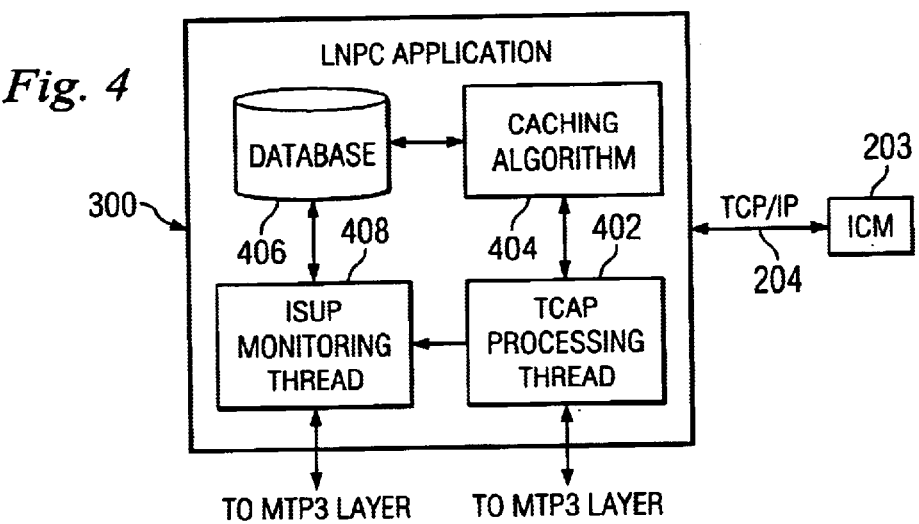
FIG. 4 is a functional block diagram of the LNPC.

FIG. 4. is a simplified block diagram of the LNPC application 300. While not explicitly shown, it should be understood that the LNPC application 300 runs on the ICP platform. When a message is received from the MTP3 layer, a TCAP thread 402 executes and evaluates the TCAP information to determine if the message is an LNP lookup. If it is an LNP lookup, a query is created and passed through the LNP caching algorithm 404 to the local, high-speed database 406 for updated routing information.

If the local database 406 does not contain an entry for the query, the TCAP thread 402 sends the query to the destination SCP via the MTP3 layer. The TCAP thread continues to run, awaiting a response from the SCP. At the same time, and ISUP monitoring thread 408 begins and monitors initial address messages (IAMs), waiting for the call corresponding to the LNP query.

When the response is received from the SCP, the TCAP thread 402 stores the result of the query in the local database 406 and passes it back to the originating SSP via the normal SS7 protocols.

If the database 406 does contain an entry for the query, a response message is created and sent back down the MTP3 stack and through I/O card to the originating SSP. The LNP application, at this point terminates the TCAP thread 402. The ISUP monitoring thread 408 monitors incoming IAMs until it detects the call corresponding to the LNP query. The thread monitors the call to see if an answer message (ANM) is received from the destination SSP, indicating that the call has been completed successfully. If the call is completed successfully, the thread terminates. If the call is not completed successfully, the ISUP thread generates an error message that is sent to the ICM 203 via the TCP/IP link 204 between the ICM 203 and the ICP. The ICM 203 processes the error message and sends commands to the LNPC 300 causing the corresponding entry in the database 406 to be deleted. The deletion command is also relayed to other LNPC applications in the network to purge the entry.

Operators use GUI applications running on the ICM 203 to perform a number of management and configuration functions on the LNPC 300. As was previously mentioned, the ICM 203 communicates with the LNPC 300 by means of the TCP/IP link 204.

The caching algorithm 404 will maximize the hit rate of the LNPC while reducing the required database storage capacity. The caching algorithm 404 can be configured or changed using a GUI application running on the ICM 203. Different caching algorithms can be employed depending on the profile of the local subscribers. For example, if the majority of the local subscribers are businesses, then an algorithm optimized for business customers and calling profiles may be used. Different algorithms may be used for areas where the majority of subscribers are residential users.

It is also possible to have multiple algorithms in use simultaneously. For example, if one local exchange is a large business, a specific algorithm may be deployed for that exchange while the residential algorithm is employed for other exchanges. These are just some examples of the caching algorithm scenarios that may be employed in the invention. Others may be employed as well.

The GUI applications on the ICM 203 also are used to configure and manage the database 406. As previously mentioned, each entry stored in the local database 406 has an associated time stamp. The time stamp is continually examined against a pre-defined expiration period. Once an entry has expired without being retrieved, it is purged from the database 406. The parameters and operation of this purging process can be configured using the ICM 203. The database may also be periodically backed up to traditional magnetic storage devices, employing the TCP/IP link 204 to ICM 203.

As the LNPC application 300 operates, the ICP core applications record event information that can be collected, processed, and analyzed by GUI applications on the ICM 203. This information can be presented to operators and analyzed for a variety of purposes. Data related to the number of LNP queries, number of cache hits, and number of SCP queries can be analyzed to determine the efficiency of the caching algorithm(s), and the SCP charges avoided. It can also be used to audit the SCP charges reported by operators of the SCP database.

Other reports can be generated to determine the number and percentage of hits on specific exchanges or telephone numbers. The number of incorrectly routed calls can also be reported. The average response time of the local cache can be determined and compared to the average response time for various SCPs. The overall LNPC statistics could also be analyzed to give an indication of bandwidth usage.

Figure 5:
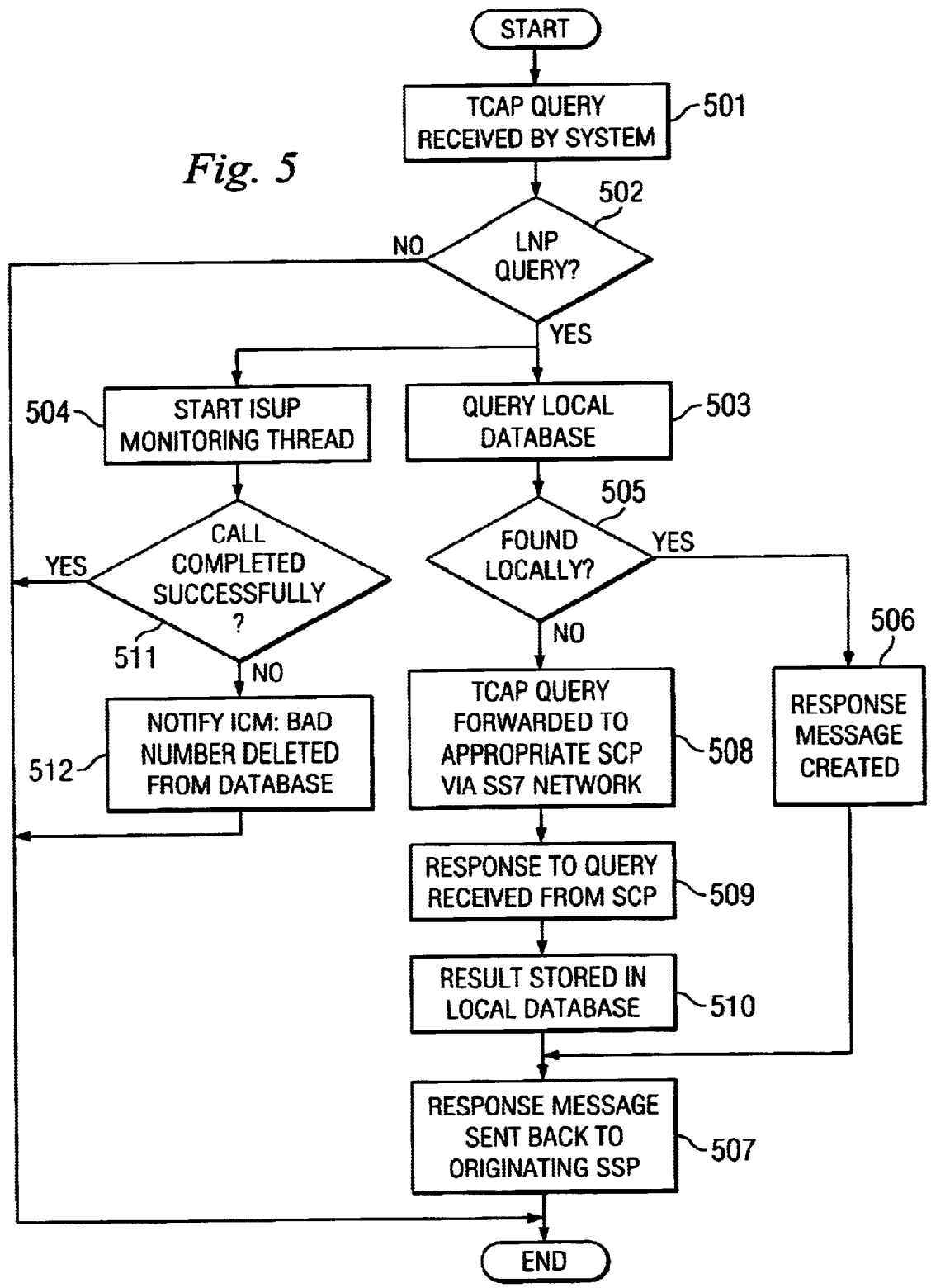
FIG. 5 is a flow chart illustrating the operation of the LNPC.

FIG. 5 provides a flowchart of the LNPC functions. As a TCAP query is received 501 it is evaluated 502 to determine if it is an LNP lookup. If not, no further action is performed. If it is an LNP lookup, a query is made to the local database 503, and an ISUP monitoring thread starts 504, checking all the IAMs for incoming calls. The result of the query is evaluated 505. If the routing information is found in the local database, a result message is created 506 and sent to the originating SSP by the normal means 507. If the routing information is not found in the database, the query is forwarded to the appropriate SCP database 508. When the response is received from the SCP 509, the result is stored in the local database 510, and is sent to the originating SSP by the normal means 507.

The ISUP monitoring thread continues to execute, monitoring the associated call until it determines if the call is successfully completed 511. If the call is successfully completed, the thread terminates and no further actions are necessary. If the call is not successfully completed, the thread reads the release message and determines the failure cause code. The ICM is notified and the bad routing information is deleted from the database 512.

It is understood that the present invention can take many forms and embodiments. The embodiments shown herein are intended to illustrate rather than to limit the invention, it being appreciated that variations may be made without departing from the spirit of the scope of the invention. The algorithms and process functions performed by the system may be organized into any number of different modules or computer programs for operation on one or more processors or workstations within the system. Different configurations of computers and processors for the system are contemplated. The programs used to implement the methods and processes of the system are implemented in any appropriate programming language and run in cooperation with any hardware device. The system may be used for service providers, Internet Service Providers (ISPs), enterprises, and many other entities utilizing SS7 signaling devices.

Although illustrative embodiments of the invention have been shown and described, a wide range of modifications, change, and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for intelligently caching Local Number Portability (LNP) queries from a Public Switched Telephone Network (PSTN), the apparatus comprising:

an intelligent communications platform (ICP) connected between a switch and a Signaling System 7 (SS7) network to intercept Transactions Capabilities Applications Part (TCAP) messages between the switch and the SS7 network, the ICP including an LNP application for analyzing the intercepted TCAP messages, querying a database of the LNP application to determine whether routing information for a corresponding call is located in the local database, and, if the routing information is located in the local database, sending a result message by normal means, otherwise; querying an appropriate signal control point (SCP) database for the routing information, storing received routing information in the local database, and time-stamping the stored routing information; and a communications control module connected to the intelligent communications platform via a Transmission Control Protocol/Internet Protocol (TCP/IP) link, the communications control module for providing management and communications to the ICP and providing access to the management and communication for a plurality of subscribers;

wherein upon the occurrence of a predetermined condition, the stored routing information is deleted from the local database and wherein the ICP does not include a point code and provides a fail safe mode of operation to transparently pass TCAP messages in case of ICP failure.

2. The apparatus of claim 1 wherein the ICP includes:

an SS7 I/O card for processing SS7 messages; and a CPU card for processing Integrated Services Digital Network User Part (ISUP) and TCAP messages.

3. The apparatus of claim 1 wherein the communications control module includes instructions for receiving messages from other ICPs for updated information on LNP queries.

4. The apparatus of claim 1 wherein the communications control module includes instructions for the plurality of subscribers to view results of LNP queries.

5. The apparatus of claim 1 wherein the predetermined condition is selected from a group consisting of expiration of the time stamp and unsuccessful completion of the call.

6. A system for intelligently caching Local Number Portability (LNP) queries from a Public Switched Telephone Network (PSTN), the system comprising:

instructions for an intelligent communications platform (ICP) connected between a switch and a Signaling System 7 (SS7) network to intercept Transactions Capabilities Applications Part (TCAP) messages between the switch and the SS7 network, the ICP instructions including instructions for an LNP application for analyzing the intercepted TCAP messages, querying a local database of the LNP application to determine whether routing information for a corresponding call is located in the local database, and, if the routing information is located in the local database, sending a result message by normal means; otherwise, querying an appropriate signal control point (SCP) database for the routing information, storing received routing information in the local database, time-stamping the received routing information, and deleting the stored routing information upon the occurrence of a predetermined condition; and instructions for a communications control module connected to the intelligent communications platform via a Transmission Control Protocol/Internet Protocol (TCP/IP) link to provide management and communications to the ICP and to provide access to the management and communication for a plurality of subscribers and wherein the ICP does not include a point code and provides a fail safe mode of operation to transparently pass TCAP messages in case of ICP failure.

7. The system of claim 6 further including:

instructions for an SS7 I/O card to process SS7 messages; and instructions for a CPU card to process Integrated Services Digital Network User Part (ISUP) and TCAP messages.

8. The system of claim 6 further including instructions for receiving messages from other ICPs for updated information on LNP queries.

9. The system of claim 6 further including:

instructions for the plurality of subscribers to view results of LNP queries.

10. The system of claim 5 wherein the predetermined condition is selected from a group consisting of expiration of the time stamp and unsuccessful completion of the call.

11. A method for intelligently caching Local Number Portability (LNP) queries from a Public Switched Telephone Network (PSTN), the method comprising:

intercepting Transactions Capabilities Applications Part (TCAP) messages by an intelligent communications platform connected between a switch and a Signaling System 7 (SS7) network, wherein the SS7 messages are from the switch and to the SS7 network and wherein the ICP does not include a point code;

analyzing the intercepted TCAP messages;

querying a local database to determine whether routing information is located in the local database;

if routing information is located in the local database, sending a result message by normal means, otherwise, querying an appropriate signal control point (SCP) database for the routing information, storing received routing information in the local database, and time-stamping the stored routing information;

providing management and communications control from a communications control module connected to the intelligent communications platform via a Transmission Control Protocol/Internet Protocol (TCP/IP) link;

providing access to the communications control module to a plurality of subscribers; and deleting the stored routing information from the local database upon the occurrence of a predetermined condition; and providing a fail safe mode of operation to transparently pass TCAP messages in case of ICP failure.

12. The method of claim 11 further including:

processing SS7 messages with an SS7 I/O card; and processing Integrated Services Digital Network User Part (ISUP) and TCAP messages with a CPU card.

13. The method of claim 11 further including receiving messages from other ICPs for updated information LNP queries.

14. The method of claim 11 further including:

providing the ability for the plurality of subscribers to view results of LNP queries.

15. The method of claim 9 wherein the predetermined condition is selected from a group consisting of expiration of the time stamp and unsuccessful completion of the call.

\* \* \* \* \*